(12) United States Patent
Fossum et al.

(10) Patent No.: US 7,143,126 B2
(45) Date of Patent: Nov. 28, 2006

(54) METHOD AND APPARATUS FOR IMPLEMENTING POWER OF TWO FLOATING POINT ESTIMATION

(75) Inventors: Gordon Clyde Fossum, Austin, TX (US); Stephen Joseph Schwinn, Lakeville, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/607,359

(22) Filed: Jun. 26, 2003

(65) Prior Publication Data

US 2004/0267853 A1   Dec. 30, 2004

(51) Int. Cl.
*G06F 1/02* (2006.01)
(52) U.S. Cl. ..................................... 708/277
(58) Field of Classification Search ............... 708/204, 708/277, 512, 517

See application file for complete search history.

(56) References Cited

U.S. PATENT DOCUMENTS

| | | | | |
|---|---|---|---|---|
| 4,078,250 A * | 3/1978 | Windsor et al. | ............ | 708/204 |
| 4,583,180 A * | 4/1986 | Kmetz | ........................ | 708/204 |
| 5,365,465 A * | 11/1994 | Larson | ........................ | 708/204 |
| 6,178,435 B1 * | 1/2001 | Schmookler | ................ | 708/277 |
| 6,289,367 B1 * | 9/2001 | Allred | ........................ | 708/277 |

* cited by examiner

*Primary Examiner*—Chuong D. Ngo
(74) *Attorney, Agent, or Firm*—Joan Pennington

(57) ABSTRACT

A method and apparatus are provided for implementing a power of two estimation function in a general purpose floating-point processor. A floating point number is stored within a memory. The floating point number includes a sign bit, a plurality of exponent bits, and a mantissa having an implied bit and a plurality of fraction bits. In response to a floating-point instruction, the mantissa is partitioned into an integer part and a fraction part, based on the exponent bits. A floating-point result is provided by assigning the integer part of the floating point number as an unbiased exponent of the floating-point result, and by utilizing combinational logic hardware for converting the fraction part of the floating point number to a fraction part of the floating point result.

6 Claims, 6 Drawing Sheets

US 7,143,126 B2

METHOD AND APPARATUS FOR IMPLEMENTING POWER OF TWO FLOATING POINT ESTIMATION

FIELD OF THE INVENTION

The present invention relates generally to the data processing field, and more particularly, relates to a method and apparatus for implementing a power of two estimation function, for example, within a general purpose floating point processor.

DESCRIPTION OF THE RELATED ART

An exponential function, such as a power of two function, is commonly encountered in graphical applications. However, many processor cycles are typically required for the execution of an exponential function in a general purpose processor that does not have an exponential function in its instruction set. Typically processors having an exponential function in their instruction set require several processor cycles to execute an exponential function via microcode.

U.S. Pat. No. 6,178,435 to Martin Stanley Schmookler issued Jan. 23, 2001 and assigned to the present assignee, discloses a method for performing a power of two estimation on a floating-point number within a data processing system. A fast implementation is provided of a power of two function, i.e., $y=2^x$, for a general purpose processor, where both the argument x and the result y are represented in a floating-point format. A floating-point format used for the purpose of illustration is the IEEE 754 format. The floating-point number includes a sign bit, multiple exponent bits, and a mantissa having an implied bit and multiple fraction bits. In order to estimate the power of two of the floating-point number, the mantissa is partitioned into an integer part and a fraction part, based on the value of the exponent bits.

In the disclosed implementation, a floating-point result is formed by assigning the integer part of the floating-point number as an unbiased exponent of the floating-point result, and by converting the fraction part of the floating-point number via a table lookup to become a fraction part of the floating-point result. The integer part forms the exponent of the result and the fraction part is used to find a 6 bit value from a table. This value is then added to the fraction part utilizing a 2 addend 6 bit adder structure to form the fraction of the result. A representative result obtained in this manner has a worst-case relative error to the exact result of $0.822 \times 2^{-5}$. Also, as seen in FIG. 5, the estimation function produced by prior art designs contains several noticeable discontinuities.

A need exists for an improved mechanism for implementing a power of two estimation function. It is desirable that such mechanism provides a more accurate estimate and that the estimation function be made to be more continuous than prior art designs.

SUMMARY OF THE INVENTION

A principal object of the present invention is to provide a method and apparatus for implementing a power of two estimation function, for example, within a general purpose floating-point processor. Other important objects of the present invention are to provide such method and apparatus for implementing a power of two estimation function substantially without negative effect and that overcome some of the disadvantages of prior art arrangements.

In brief, a method and apparatus are provided for implementing a power of two estimation function in a general purpose floating-point processor. A floating point number is stored within a memory. The floating point number includes a sign bit, a plurality of exponent bits, and a mantissa having an implied bit and a plurality of fraction bits. In response to a floating-point instruction, the mantissa is partitioned into an integer part and a fraction part, based on the exponent bits. A floating-point result is provided by assigning the integer part of the floating point number as an unbiased exponent of the floating-point result, and by utilizing combinational logic hardware for converting the fraction part of the floating point number to a fraction part of the floating point result. The floating-point result is stored in the memory.

In accordance with features of the invention, the combinational logic hardware includes combinational logic that receives the fraction part F of the floating point number and produces two numbers A and B dependant on the plurality of fraction bits of the fraction part F. The sum of the two numbers A and B subtracted from F produces the fraction bits of the floating point result. Combinational logic hardware can be implemented by combinational logic and an adder structure for adding A and B with the ones complement of F represented by (−result=−F+A+B), then taking the ones complement of this sum to produce a fraction part of the floating point result.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
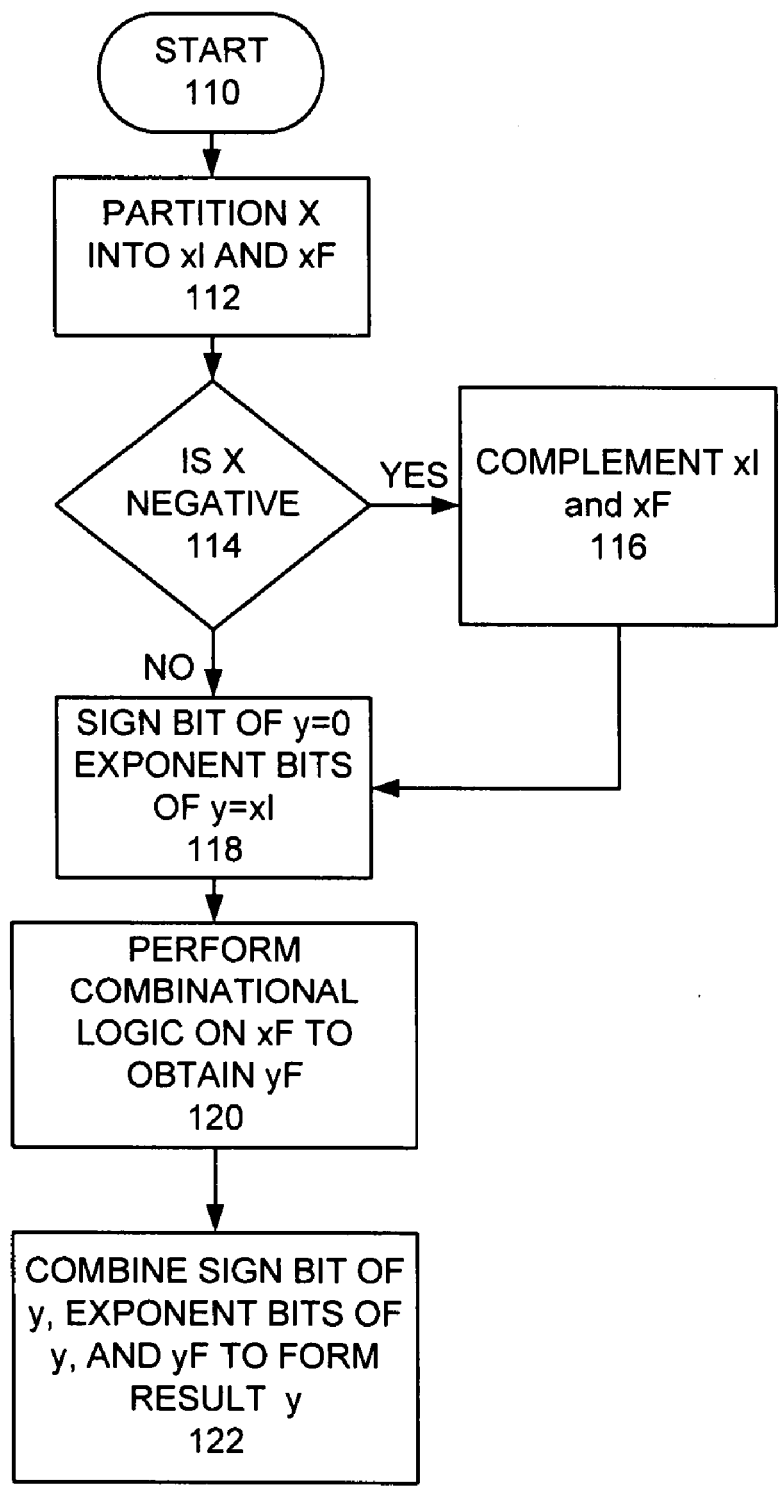
FIG. 1 is a high-level flow diagram illustrating a method for performing a power of two estimation within a data processing system in accordance with the preferred embodiment.

Having reference now to the drawings, in FIG. 1, there is shown a high-level flow diagram illustrating a method for performing a power of two estimation within a data processing system in accordance with the preferred embodiment. A power of two estimation if $y=2^x$ function is provided within a general purpose processor. According to the IEEE 754 format, a normalized floating-point number, such as x, is represented by three groups of bits, namely, a sign bit, exponent bits, and mantissa bits. The sign bit is the most significant bit of the floating-point number. The next eight bits are the exponent bits, which represent the biased exponent of the floating-point number. An unbiased exponent can be obtained by subtracting 127. The 23 least significant bits are the fraction bits; and the mantissa is computed by dividing these 23 bits by $2^{23}$ and adding 1.0 to the quotient for non-denormal numbers.

The value of a floating-point number x is partitioned into the sum of two parts, namely, a signed integer xI and a positive fraction xF. With the above partition, xI becomes the unbiased exponent of y, while the mantissa of y is equal to $2^{xF}$. Because $0 \leq xF < 1$, therefore $1 \leq 2^{xF} < 2$. If a graph of $2^{xF}$ (a power of two function) is compared with a graph of (1+xF) (a linear function) within the range of 0 to 1, it is observed that the results from the above two functions are identical at the endpoints, while the results from the $2^{xF}$ function are typically slightly less than the results from the (1+xF) function between the endpoints. Thus, if a power of two function with a low-precision estimation is needed, then the low-precision power of two function can be obtained simply by making small corrections to the linear function.

Starting at block 110, the mantissa of a floating-point number x is partitioned into a signed unbiased integer xI and a fraction xF, as indicated in a block 112. The partitioning is determined from the exponent of x. If the sign of x is negative as indicated in a decision block 114, the partitioned mantissa is replaced by its 1's complement, as indicated in a block 116. After this step, the integer portion is a signed integer, xI, and the fraction part is a positive value xI. Then the sign of y is set to 0, corresponding to a positive value, since $2^x$ must be non-negative; and the value xI becomes the unbiased exponent of y, as indicated in a block 118. The biased exponent can be obtained by adding 127 if xI is within the normal range of −126 to +127. The fraction part of the mantissa of y, yF, is then obtained via combinational logic hardware 400 of the preferred embodiment with the fraction xF as input, as indicated in a block 120. Combinational logic hardware 400 is illustrated and described with respect to FIG. 4. Finally, the floating-point result y is formed by combining the sign bit of y, the exponent bits of y, and the fraction bits of y, as indicated in a block 122.

Figure 2:
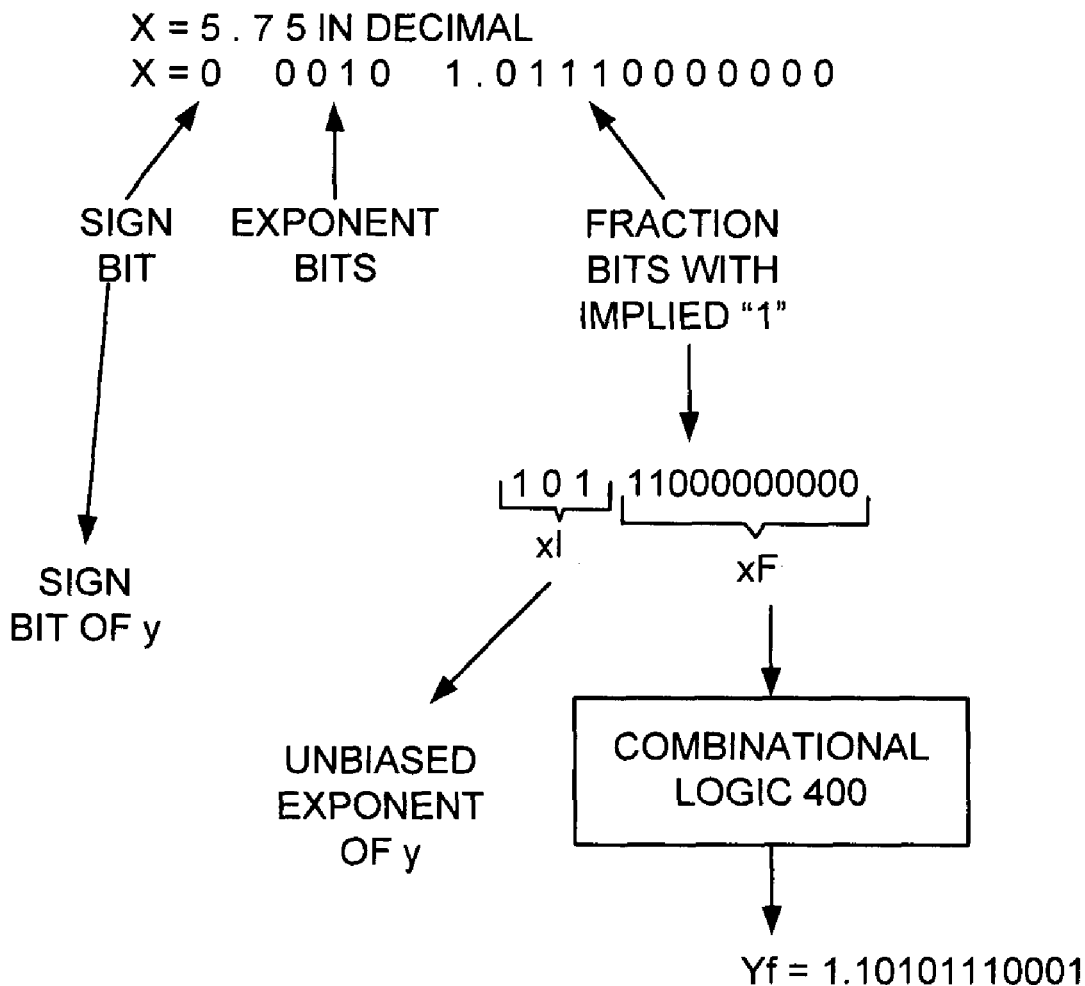
FIG. 2 is an example illustrating the method for performing a power of two estimation of FIG. 1 in accordance with the preferred embodiment.

Referring now to FIG. 2, there is shown an example illustrating a method for performing a power of two estimation within a data processing system, in accordance with a preferred embodiment of the present invention. Suppose x equals 5.75 in decimal. Then x can be represented in a floating-point format, as follows:

$$x=(-1)^{sign} * 2^{exp} * mantissa$$

where sign is a sign bit, exp is a positive unbiased exponent, and mantissa is equal to 1:fraction. Thus, x=(−1) 0*2²*1.011100 or 0 0010 01110000 in floating-point binary. Because the exponent of x equals 0010 (or 2 decimal), the implied binary point is shifted two positions to the right, such that the mantissa becomes 101.11000000000. The bits to the left of the binary point (i.e. 101) becomes an integer part xI, and the bits to the right of the binary point (i.e., 1100000000) becomes a fraction xF. Thus, $y^{exp}$ (the unbiased exponent of the floating-point result y) equals 101; and yF (the fraction of the floating-point result y) equals 1.10101110001 by utilizing the combinational logic 400 of the preferred embodiment with fraction xF as an input. The value of floating-point result y is obtained by combining $y^{exp}$ and yF to yield 110101.110001 in binary or 53.7656 in decimal.

Figure 3:
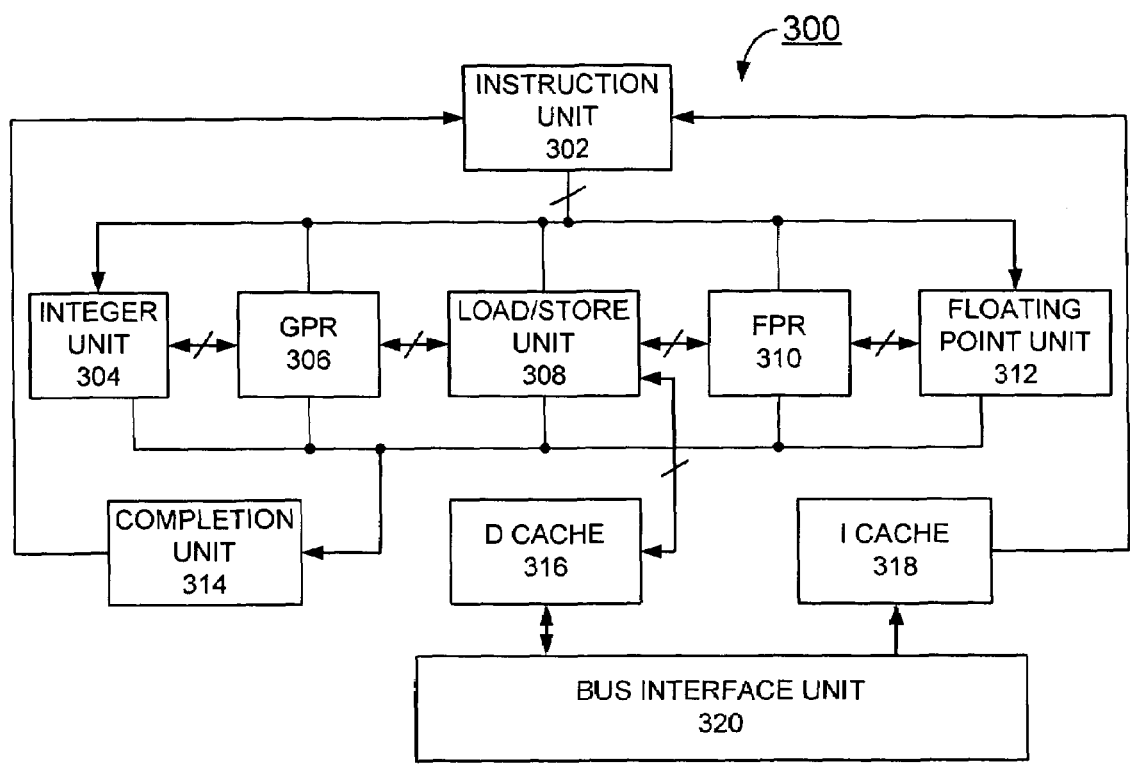
FIG. 3 is a block diagram illustrating a general purpose processor for implementing the method for performing a power of two estimation of FIG. 1 in accordance with the preferred embodiment.

Referring to FIG. 3, there is shown a general purpose processor generally designated by reference character 300 for carrying out the method for performing a power of two estimation of preferred embodiment. General purpose processor 300 includes an instruction unit 302 coupled to an integer unit 304, a general purpose register 306, a load/store unit 308, a floating point register 310, and a floating point unit 312. General purpose processor 300 includes a completion unit 314 coupled to the instruction unit 302 and each of the integer unit 304, general purpose register 306, load/store unit 308, floating point register 310, and floating point unit 312. A data cache 316 is coupled to the load/store unit 308 and an instruction cache 318 is coupled to the instruction unit 302. A bus interface unit 320 is coupled to the data cache 316 and the instruction cache 318. Both data cache 316 and instruction cache 318 are high speed set-associative caches which enable processor 300 to achieve a relatively fast access time to a subset of data or instructions previously transferred from a main memory (not shown). Instruction cache 318 is coupled to the instruction unit 302 that fetches instructions from instruction cache 318 during each execution cycle. Each of execution units, the integer unit 304, the load/store unit 308, and the floating point unit 312 can execute one or more classes of instructions, and all execution units, integer unit 304, load/store unit 308, and floating point unit 312, can operate concurrently during each processor cycle. After execution of an instruction has terminated, execution units, integer unit 304, load/store unit 308, and floating point unit 312, store data results to a respective rename buffer, depending upon the instruction type. Then, any one of execution units, integer unit 304, load/store unit 308, and floating point unit 312, can signal the completion unit 314 that the instruction execution is finished. Finally, instructions are completed in program order by transferring result data from the respective rename buffer to the general purpose register (GPR) 306 or the floating point register (FPR) 310.

General purpose processor 300 can be implemented with various standard processors, for example, with one of the PowerPC® line of processors manufactured by International Business Machines Corporation.

Figure 4:
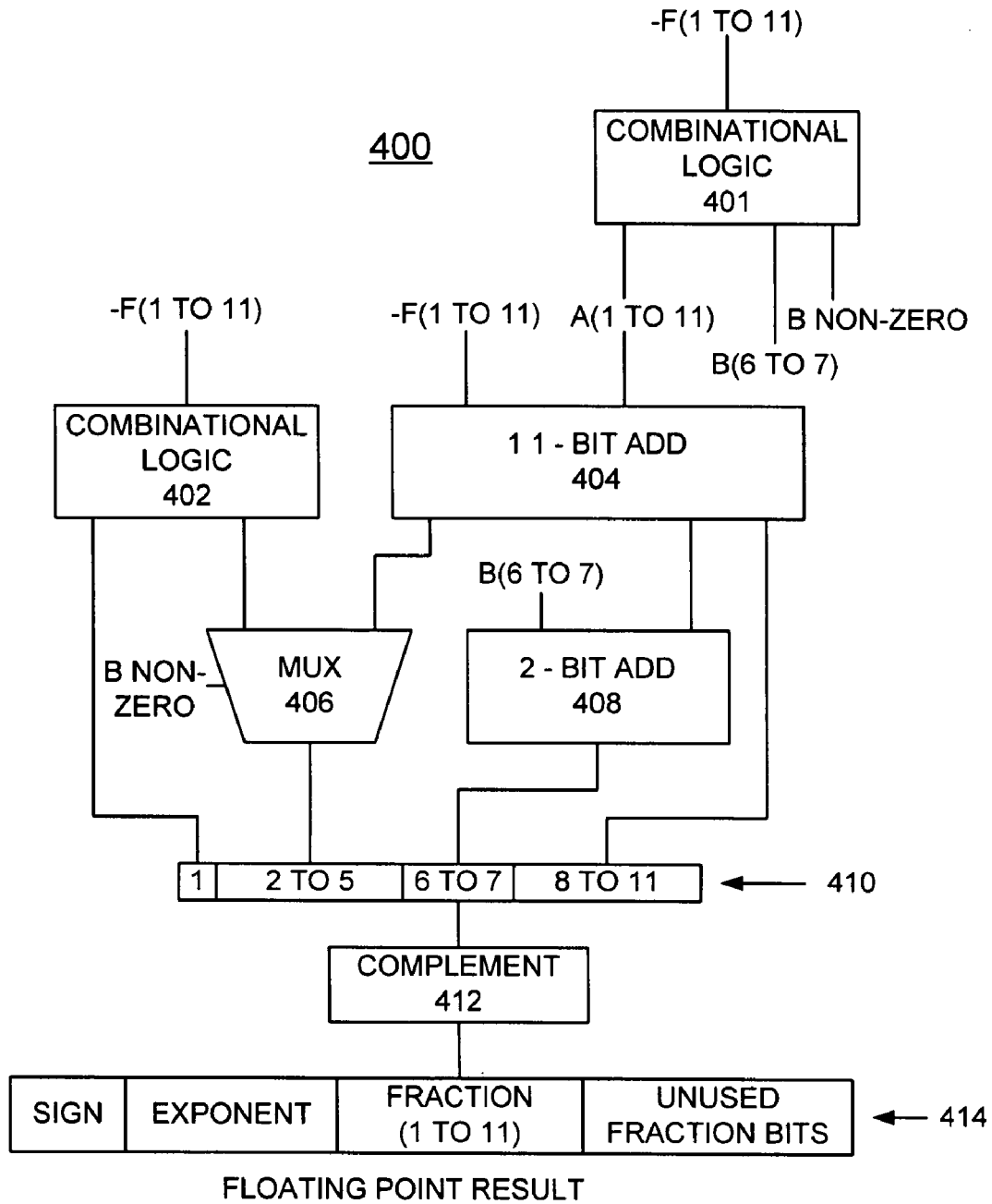
FIG. 4 is a block diagram illustrating combinational logic hardware for implementing the method for performing a power of two estimation in of FIG. 1 in accordance with the preferred embodiment.

In accordance with features of the preferred embodiment, a new method of power of two estimation in accordance with features of the preferred embodiment obtains its result without adding pipeline stages, is more accurate, and produces a function that is more continuous than prior art designs. This is accomplished by using a different approach for obtaining the fraction bits of the result. Combinational logic circuitry 400 implementing the power of two function includes a custom 3 addend 11 bit adder structure as shown in FIG. 4. The new method for obtaining the fraction bits yF of the floating point result from the aforementioned fraction part xF of the input is now described.

Two numbers (hereafter called A and B) are produced by combinational logic dependant on 11 bits of the fraction part xF described above (hereafter called F). The sum of these two numbers A and B is subtracted from F produces the 11 most significant fraction bits of the result. This can be implemented by adding A and B with the ones complement (1's complement) of F represented by (−result=−F+A+B), then taking the 1's complement of this sum to produce a fraction part of the floating point result. −F represents an inverted F or ones complement of F.

But rather than implementing the sum of these three numbers directly, which did not fit within the timing constraints of the design, the result can be obtained by combinational logic dependant on F, B and (A−F). A full general-purpose 3-way 11-bit adder is not needed since the nature this algorithm is such that not every permutation of 11 bits is seen in the numbers A and B.

Derivation of A and B from the input F may be understood from the following logic description implemented by a first combinational logic block 401 of combinational logic circuitry 400.

First Intermediate terms s1, s2, and s3 are defined as follows, where F1, F2, F3, F4, F5, F6, F7, F8, F9, F10, and F11 respectively represent bits 1 through 11 of F(1 to 11):

s1=F1 AND F2 AND F3 AND F4 s2=(NOT F1 AND NOT F2) OR (F1 AND F2 AND F3 AND NOT F4) OR (F1 AND F2 AND NOT F3 AND F4)

s3=(F2 AND NOT F3 AND NOT F4) OR (F1 AND NOT F2 AND F3) OR (NOT F1 AND F2 AND NOT F3) OR (NOT F1 AND F2 AND NOT F4)

Terms A

A1, A2, A3, A4, A5, A6, A7, A8, A9, A10, and A11 respectively represent bits 1 through 11 of A(1 to 11) are defined as follows:

A1=0

A2=0

A3=0

A4=(s1 AND NOT F3) OR (s2 AND NOT F1 AND F2) OR (s2 AND F1 AND NOT F2)

A5=(s1 AND NOT F4) OR (s2 AND NOT F1 AND F3) OR (s2 AND F1 AND NOT F3) OR (s3 AND NOT F1 AND F2) OR (s3 AND F1 AND NOT F2)

A6=(s1 AND NOT F5) OR (s2 AND NOT F1 AND F4) OR (s2 AND F1 AND NOT F4) OR (s3 AND NOT F1 AND F3) OR (s3 AND F1 AND NOT F3)

A7=(s1 AND NOT F6) OR (s2 AND NOT F1 AND F5) OR (s2 AND F1 AND NOT F5) OR (s3 AND NOT F1 AND F4) OR (s3 AND F1 AND NOT F4)

A8=(s1 AND NOT F7) OR (s2 AND NOT F1 AND F6) OR (s2 AND F1 AND NOT F6) OR (s3 AND NOT F1 AND F5) OR (s3 AND F1 AND NOT F5)

A9=(s1 AND NOT F8) OR (s2 AND NOT F1 AND F7) OR (s2 AND F1 AND NOT F7) OR (s3 AND NOT F1 AND F6) OR (s3 AND F1 AND NOT F6)

A10=(s1 AND NOT F9) OR (s2 AND NOT F1 AND F8) OR (s2 AND F1 AND NOT F8) OR (s3 AND NOT F1 AND F7) OR (s3 AND F1 AND NOT F7)

A11=(s1 AND NOT F10) OR (s2 AND NOT F1 AND F9) OR (s2 AND F1 AND NOT F9) OR (s3 AND NOT F1 AND F8) OR (s3 AND F1 AND NOT F8)

B4, B5, B6, B7 respectively represent bits 4 through 7 of B(4 to 7) and are defined as follows:

B4=(F1 AND NOT F2 AND NOT F3) OR (NOT F1 AND F2 AND F3 AND F4)

B5=(F2 AND NOT F3 AND NOT F4) OR (F1 AND NOT F2 AND F3) OR (NOT F1 AND F2 AND NOT F3) OR (NOT F1 AND F2 AND NOT F4)

B6=(NOT F1 AND F2 AND F3 AND F4) OR (F1 AND F2 AND F3 AND NOT F4) OR (F1 AND NOT F2 AND NOT F3) OR (F1 AND NOT F3 AND F4)

B7=(NOT F1 AND F2 AND F3 AND F4) OR (F1 AND NOT F3 AND NOT F4) OR (F1 AND NOT F2)

Example values produced by this new algorithm can be seen in the following Table 1:

TABLE 1

| −F(1 to 11) | A(1 to 11) | C(4 to 7) | B−F(1 to 11) | −result(1 to 11) (−F + A + C) |
|---|---|---|---|---|
| 11111111111 | 00000000000 | 0000 | 11111111111 | 11111111111 |
| 11111111110 | 00000000000 | 0000 | 11111111110 | 11111111110 |
| 11111111101 | 00000000000 | 0000 | 11111111101 | 11111111101 |
| 11111111100 | 00000000000 | 0000 | 11111111100 | 11111111100 |
| 11111111011 | 00000000001 | 0000 | 11111111100 | 11111111100 |
| 11111111010 | 00000000001 | 0000 | 11111111011 | 11111111011 |
| 11111111001 | 00000000001 | 0000 | 11111111010 | 11111111010 |
| 11111111000 | 00000000001 | 0000 | 11111111001 | 11111111001 |
| 11111110111 | 00000000010 | 0000 | 11111111001 | 11111111001 |
| 11111110110 | 00000000010 | 0000 | 11111111000 | 11111111000 |
| 11111110101 | 00000000010 | 0000 | 11111110111 | 11111110111 |
| 11111110100 | 00000000010 | 0000 | 11111110110 | 11111110110 |
| 11111110011 | 00000000011 | 0000 | 11111110110 | 11111110110 |
| 11111110010 | 00000000011 | 0000 | 11111110101 | 11111110101 |
| 11111110001 | 00000000011 | 0000 | 11111110100 | 11111110100 |
| 11111110000 | 00000000011 | 0000 | 11111110011 | 11111110011 |
| 11111101111 | 00000000100 | 0000 | 11111110011 | 11111110011 |
| * | | | | |
| * | | | | |
| * | | | | |
| 11000000000 | 00001111111 | 0000 | 11001111111 | 11001111111 |
| 10111111111 | 00001111111 | 0000 | 11001111111 | 11001111111 |
| 10111111110 | 00001000000 | 0100 | 11000111110 | 11001111110 |
| 10111111101 | 00001000000 | 0100 | 11000111101 | 11001111101 |
| 10111111100 | 00001000000 | 0100 | 11000111100 | 11001111100 |
| 10111111011 | 00001000000 | 0100 | 11000111011 | 11001111011 |
| 10111111010 | 00001000000 | 0100 | 11000111010 | 11001111010 |
| 10111111001 | 00001000000 | 0100 | 11000111001 | 11001111001 |
| 10111111000 | 00001000000 | 0100 | 11000111000 | 11001111000 |
| * | | | | |
| * | | | | |
| * | | | | |
| 01101100011 | 00000000000 | 1011 | 01101100011 | 10000010011 |
| 01101100010 | 00000000000 | 1011 | 01101100010 | 10000010010 |
| 01101100001 | 00000000000 | 1011 | 01101100001 | 10000010001 |
| 01101100000 | 00000000000 | 1011 | 01101100000 | 10000010000 |
| 01101011111 | 00000000000 | 1011 | 01101011111 | 10000001111 |
| 01101011110 | 00000000000 | 1011 | 01101011110 | 10000001110 |
| 01101011101 | 00000000000 | 1011 | 01101011101 | 10000001101 |
| 01101011100 | 00000000000 | 1011 | 01101011100 | 10000001100 |
| 01101011011 | 00000000000 | 1011 | 01101011011 | 10000001011 |
| 01101011010 | 00000000000 | 1011 | 01101011010 | 10000001010 |
| * | | | | |
| * | | | | |
| * | | | | |
| 00000000110 | 00000000011 | 0000 | 00000001001 | 00000001001 |
| 00000000101 | 00000000010 | 0000 | 00000000111 | 00000000111 |
| 00000000100 | 00000000010 | 0000 | 00000000110 | 00000000110 |
| 00000000011 | 00000000001 | 0000 | 00000000100 | 00000000100 |
| 00000000010 | 00000000001 | 0000 | 00000000011 | 00000000011 |
| 00000000001 | 00000000000 | 0000 | 00000000001 | 00000000001 |
| 00000000000 | 00000000000 | 0000 | 00000000000 | 00000000000 |

Referring now to FIG. 4, implementation of the new algorithm is shown in the combinational logic hardware 400. Combinational logic hardware 400 includes a combinational logic 401 receiving an input −F(1 to 11). Outputs A and B are produced by combinational logic 401 dependant on 11 bits of the fraction part xF or −F(1 to 11) as listed in Table 1 and shown at lines labeled A(1 to 11) and B(6 to 7) and B NON-ZERO in FIG. 4.

Combinational logic hardware 400 includes a combinational logic 402 receiving an input −F(1 to 11) and a 11-bit add 404 receiving inputs −F(1 to 11) and A(1 to 11). A respective output of combinational logic 402 and 11-bit add 404 is coupled to a multiplexer (MUX) 406 with a B nonzero select input. A 2-bit add 408 receives inputs B(6 to 7) and output of the 11-bit add 404. A result fraction stored at register 410 is implemented by adding A and B with a ones complement (1's complement) of F represented by (-result=-F+A+B) or a ones complement result 410. A 1's complement of this sum (-result) 410 is taken as indicated in a block 412 to produce a fraction part of the floating point result as indicated in a block 414. The floating point result 414 includes the sign, exponent, the fraction part, and unused fraction bits.

Some bits of the -result fraction stored at register 410 can be more simply implemented with combinational logic dependant on -F, B and (A-F), while others can be expressed in less complex logic by only depending upon -F. Specifically as shown in FIG. 4, since bits 8 to 11 of B are zero for every possible input of F, only -F and A are added by 11-bit add 404 to produce the ones complement of the result bits 8 to 11. Bits 6 and 7 of the result are produced by 2-bit add 408 by adding the intermediate sum of -F(6 to 7) and A(6 to 7) provided by 11-bit add 404 with B(6 to 7) provided by combinational logic 401. Bits 2 to 5 of the result are produced via MUX 406 by combinational logic 402 dependant only upon -F(1 to 11) in the case when B is non-zero, and the sum of -F and A provided by 11-bit add 404 when B is zero. Bit 1 of the result is solely derived by combinational logic 402 dependant upon -F.

Derivation of the complimented fraction result bits 1 to 5 (bits 2 to 5 input to MUX 406) by combinational logic 402 from the input F are defined as follows:

complimented fraction result bit 1:
INV_RESULT1=(NOT F1) OR
  (NOT F2 AND NOT F3 AND NOT F4) OR
  (NOT F2 AND NOT F3 AND NOT F5 AND NOT F6) OR
  (NOT F2 AND NOT F3 AND NOT F5 AND NOT F7)
INV_RESULT2=(F1 AND NOT F2 AND F3) OR
  (F2 AND NOT F3 AND NOT F4) OR
  (F4 AND F5 AND F1 AND NOT F2) OR
  (F1 AND NOT F2 AND F6 AND F7 AND F4) OR
  (NOT F5 AND NOT F6 AND NOT F1 AND F2 AND NOT F3 AND NOT F7) OR
  (NOT F8 AND NOT F9 AND NOT F5 AND NOT F6 AND NOT F1 AND F2 AND NOT F3 AND NOT F10)
INV_RESULT3=(F1 AND NOT F2 AND (3) AND NOT F4) OR
  (NOT F1 AND F2 AND F3 AND NOT F4) OR
  (F1 AND NOT F3 AND F2 AND F4) OR
  (F4 AND F5 AND F1 AND NOT F3) OR
  (F2 AND NOT F3 AND F4 AND F5) OR
  (F2 AND NOT F3 AND F4 AND F6) OR
  (NOT F1 AND F2 AND F3 AND NOT F5 AND NOT F6) OR
  (F6 AND F7 AND F1 AND NOT F3 AND F4) OR
  (F1 AND NOT F2 AND F3 AND NOT F5 AND NOT F6 AND NOT F7) OR
  (F1 AND NOT F2 AND F3 AND NOT F5 AND NOT F6 AND NOT F8) OR
  (F1 AND NOT F2 AND F3 AND NOT F5 AND NOT F6 AND NOT F9) OR
  (F2 AND F3 AND NOT F4 AND NOT F5) OR
  (F6 AND NOT F7 AND NOT F1 AND F2 AND F4 AND NOT F5) OR
  (F2 AND NOT F4 AND NOT F6 AND NOT F7 AND F3 AND NOT F8) OR
  (F2 AND NOT F4 AND NOT F6 AND NOT F7 AND F3 AND NOT F9) OR
  (NOT F5 AND NOT F6 AND NOT F1 AND F2 AND F4 AND F7 AND F8) OR
  (NOT F5 AND NOT F6 AND NOT F1 AND F2 AND F4 AND F7 AND F9) OR
  (NOT F5 AND NOT F6 AND NOT F1 AND F2 AND F4 AND F7 AND F10)
INV_RESULT4=(F4 AND F5 AND F1 AND NOT F2) OR
  (F4 AND F5 AND NOT F1 AND F2) OR
  (NOT F4 AND NOT F5 AND F1 AND NOT F2 AND NOT F6) OR
  (F1 AND NOT F2 AND F3 AND F4 AND F6) OR
  (F6 AND F7 AND NOT F1 AND F2 AND F4) OR
  (F2 AND F3 AND NOT F4 AND NOT F1 AND NOT F5 AND NOT F6) OR
  (F1 AND F5 AND F2 AND F3 AND NOT F4 AND F6) OR
  (NOT F4 AND NOT F5 AND F1 AND NOT F3 AND NOT F2 AND NOT F7) OR
  (F1 AND F5 AND F2 AND F3 AND NOT F4 AND F7) OR
  (F8 AND F9 AND F1 AND F5 AND F2 AND F3 AND NOT F4) OR
  (NOT F8 AND NOT F9 AND F2 AND F3 AND NOT F4 AND NOT F1 AND NOT F5 AND NOT F7) OR
  (F2 AND NOT F3 AND F4 AND F1 AND NOT F6) OR
  (F2 AND NOT F3 AND F4 AND NOT F5 AND F6) OR
  (F6 AND F7 AND F1 AND NOT F3 AND F4 AND NOT F5) OR
  (NOT F6 AND F7 AND F2 AND NOT F3 AND F4 AND F8) OR
  (NOT F6 AND F7 AND F2 AND NOT F3 AND F4 AND F9) OR
  (NOT F6 AND F7 AND F2 AND NOT F3 AND F4 AND F10) OR
  (F1 AND NOT F3 AND NOT F5 AND NOT F6 AND NOT F4 AND NOT F7 AND NOT F8) OR
  (F6 AND NOT F7 AND F1 AND NOT F2 AND F3 AND NOT F5 AND NOT F8) OR
  (F1 AND NOT F3 AND NOT F5 AND NOT F6 AND NOT F4 AND NOT F7 AND NOT F9) OR
  (NOT F8 AND NOT F9 AND F6 AND NOT F7 AND F2 AND NOT F3 AND F4) OR
  (F1 AND NOT F3 AND NOT F5 AND NOT F6 AND NOT F4 AND NOT F7 AND NOT F10) OR
  (F6 AND NOT F7 AND F2 AND NOT F3 AND F4 AND NOT F8 AND NOT F10) OR
  (F8 AND F9 AND NOT F6 AND F7 AND F1 AND NOT F2 AND F3 AND NOT F5) OR
  (F6 AND NOT F7 AND F1 AND NOT F2 AND F3 AND NOT F5 AND NOT F9 AND NOT F10)
INV_RESULT5=(NOT F4 AND NOT F5 AND NOT F1 AND F2 AND NOT F3) OR
  (F1 AND F5 AND NOT F2 AND NOT F3 AND NOT F6) OR
  (NOT F1 AND F2 AND F3 AND F5 AND NOT F6) OR
  (F1 AND F5 AND NOT F2 AND NOT F3 AND NOT F7) OR
  (F1 AND F5 AND NOT F2 AND NOT F6 AND NOT F7) OR
  (F1 AND NOT F2 AND F6 AND F7 AND NOT F5) OR
  (F6 AND F7 AND NOT F1 AND F2 AND NOT F5) OR (F1 AND NOT F2 AND F3 AND NOT F5 AND F4 AND F6) OR
(F4 AND F5 AND NOT F1 AND F2 AND F3 AND NOT F7) OR
(F4 AND F5 AND NOT F1 AND F2 AND NOT F6 AND NOT F7) OR
(NOT F8 AND NOT F9 AND F1 AND F5 AND NOT F2 AND NOT F6) OR
(F2 AND NOT F4 AND NOT F6 AND NOT F7 AND F1 AND F3 AND NOT F5) OR
(F6 AND F7 AND F1 AND F5 AND F2 AND NOT F3 AND F4) OR
(F8 AND F9 AND F1 AND NOT F2 AND F3 AND NOT F5 AND F6) OR
(F1 AND NOT F2 AND F3 AND NOT F5 AND F6 AND F8 AND F10) OR
(F1 AND F5 AND NOT F2 AND NOT F6 AND NOT F8 AND NOT F10 AND NOT F11) OR
(F8 AND F9 AND F1 AND NOT F2 AND F3 AND NOT F5 AND F4 AND F7) OR
(F6 AND NOT F7 AND F2 AND NOT F3 AND NOT F5) OR
(NOT F4 AND NOT F5 AND F2 AND NOT F3 AND F7) OR
(F2 AND NOT F3 AND F4 AND F1 AND NOT F5 AND NOT F6) OR
(F1 AND F5 AND F2 AND F3 AND NOT F4 AND F6) OR
(NOT F6 AND F7 AND F1 AND F5 AND F3 AND NOT F4) OR
(F4 AND F5 AND NOT F1 AND F2 AND NOT F6 AND NOT F8) OR
(NOT F4 AND NOT F5 AND NOT F1 AND F2 AND F6 AND F9) OR
(NOT F5 AND NOT F6 AND F2 AND NOT F3 AND F7 AND F9) OR
(NOT F5 AND NOT F6 AND F2 AND NOT F3 AND F7 AND F10) OR
(F2 AND NOT F4 AND NOT F6 AND NOT F7 AND NOT F1 AND NOT F3 AND NOT F8) OR
(F6 AND NOT F7 AND F2 AND F3 AND NOT F4 AND F5 AND NOT F8) OR
(NOT F5 AND NOT F6 AND F1 AND F2 AND NOT F4 AND F7 AND NOT F8) OR
(F6 AND NOT F7 AND F2 AND NOT F3 AND F4 AND F1 AND F8) OR
(F8 AND F9 AND F1 AND F5 AND F2 AND F3 AND NOT F4) OR
(NOT F8 AND NOT F9 AND F2 AND NOT F4 AND NOT F6 AND NOT F7 AND NOT F3 AND F5) OR
(F6 AND NOT F7 AND F2 AND F3 AND NOT F4 AND NOT F1 AND F8 AND NOT F9) OR
(F2 AND NOT F4 AND NOT F6 AND NOT F7 AND NOT F3 AND F5 AND NOT F8 AND NOT F10) OR
(F1 AND NOT F3 AND NOT F8 AND NOT F9 AND F2 AND NOT F5 AND F7 AND NOT F10) OR
(F6 AND NOT F7 AND F1 AND F5 AND NOT F3 AND F4 AND F9 AND F10) OR
(F2 AND NOT F4 AND NOT F6 AND NOT F7 AND NOT F3 AND F5 AND NOT F8 AND NOT F11) OR
(NOT F8 AND NOT F9 AND F6 AND NOT F7 AND F1 AND F5 AND F3 AND NOT F4 AND NOT F10) OR
(NOT F6 AND F7 AND F2 AND NOT F3 AND F4 AND NOT F1 AND F8 AND NOT F9 AND NOT F10) OR
(F8 AND F9 AND F2 AND NOT F4 AND NOT F6 AND NOT F7 AND F1 AND NOT F5 AND F10) OR
(NOT F8 AND NOT F9 AND F6 AND NOT F7 AND F1 AND F5 AND F3 AND NOT F4 AND NOT F1) OR
(F6 AND F7 AND NOT F8 AND NOT F9 AND F2 AND NOT F3 AND F4 AND F1 AND NOT F11) OR
(F2 AND NOT F4 AND NOT F6 AND NOT F7 AND NOT F1 AND NOT F3 AND NOT F9 AND NOT F10 AND NOT F11) OR
(NOT F5 AND NOT F6 AND F1 AND F2 AND NOT F4 AND F7 AND NOT F9 AND NOT F10 AND NOT F1) OR
(F8 AND F9 AND F2 AND F3 AND NOT F4 AND F5 AND NOT F7 AND NOT F10 AND NOT F11) OR
(NOT F6 AND F7 AND F2 AND NOT F3 AND F4 AND NOT F1 AND NOT F9 AND F10 AND NOT F11)

Figure 5:
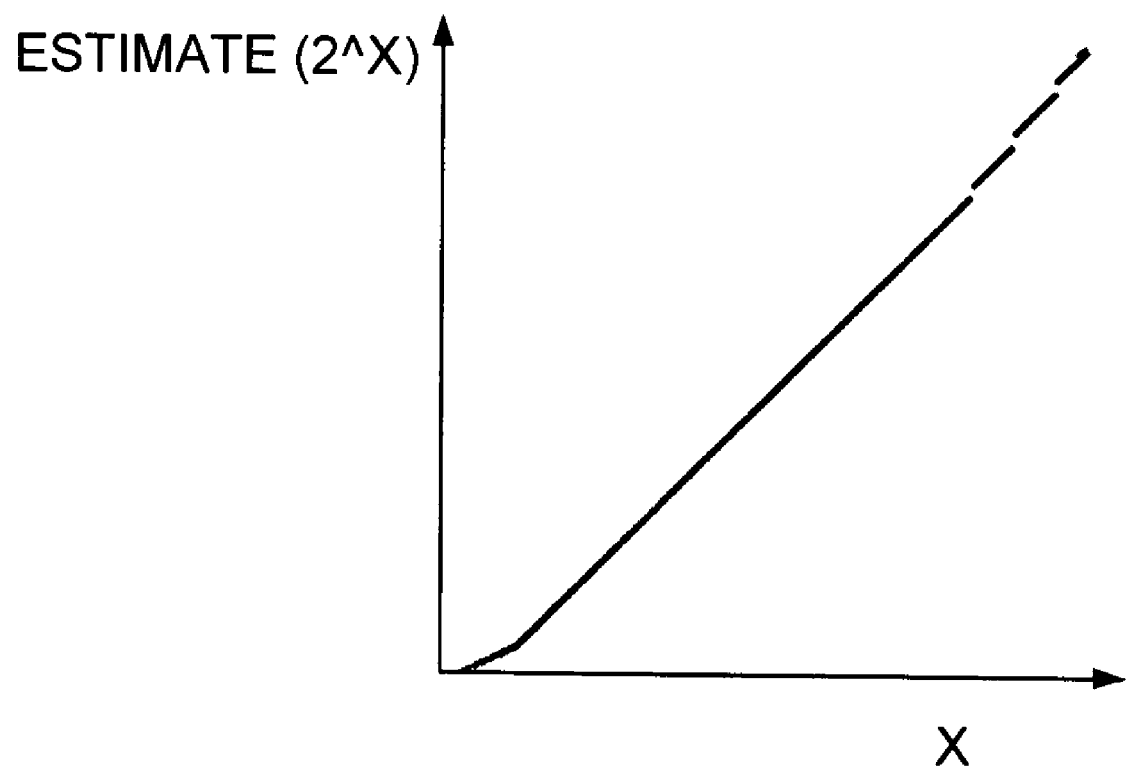
FIG. 5 is a graph illustrating a prior art estimation function.
Figure 6:
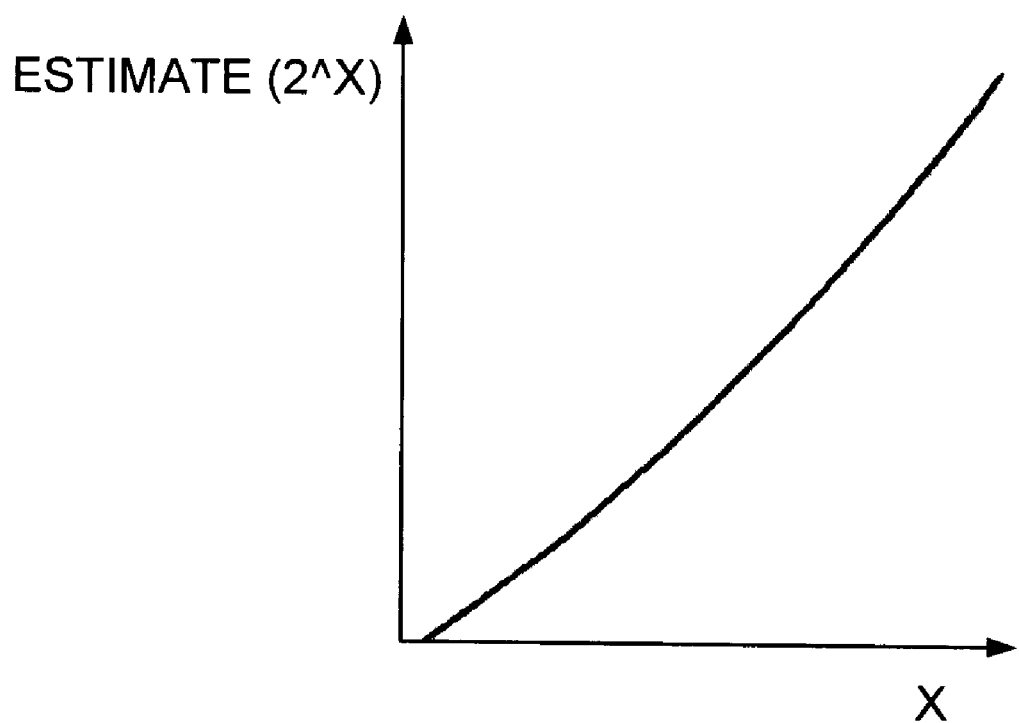
FIG. 6 is a graph illustrating an estimation function of the method of FIG. 1 with the combinational logic hardware of FIG. 4 in accordance with the preferred embodiment.

Referring to FIGS. 5 and 6, it can be seen that combinational logic hardware 400 is able to achieve a much more continuous set of results as seen in FIG. 6 when compared to the prior art results of FIG. 5, and its worst-case relative error to the exact result is $0.144 \times 2^{-5}$, which is much more improved over the previous design. The method of the preferred embodiment utilizing combinational logic hardware 400 also can be implemented without adding architectural stages as compared to the prior art.

The benefits of this improved algorithm of the preferred embodiment are apparent in a common application of the power of 2 estimation, such as in real-time three-dimensional computer graphics, where a power of 2 estimation algorithm can be used to calculate the gradient in shading of the specular highlight on a surface. For example, application of the power of 2 estimation algorithm of the preferred embodiment results in less banding and a more realistic looking specular highlight in real-time three-dimensional computer graphics.

While the present invention has been described with reference to the details of the embodiments of the invention shown in the drawing, these details are not intended to limit the scope of the invention as claimed in the appended claims.

What is claimed is:

1. Apparatus for implementing a power of two floating point estimation function comprising:
    a processor for storing a floating point number within a memory; said floating point number including a sign bit, a plurality of exponent bits, and a mantissa having an implied bit and a plurality of fraction bits;
    said processor in response to a floating-point instruction, for partitioning said mantissa into an integer part and a fraction part, based on said exponent bits; and for yielding a floating-point result by assigning said integer part of said floating point number as an unbiased exponent of said floating-point result,
    combinational logic hardware for converting said fraction part of said floating point number to a fraction part of said floating point result; and
    said plurality of said fraction bits of said mantissa of said floating point number are represented by F and said combinational logic hardware for converting said fraction part of said floating point number to a fraction part of said floating point result includes first combinational logic receiving said fraction bits F for producing two numbers represented by A and B, where the sum of A and B subtracted from F produces said fraction part of said floating point result.

2. Apparatus for implementing a power of two floating point estimation function as recited in claim 1 wherein said combinational logic hardware includes an adder for adding A and B with a ones complement of F to provide a ones complement result represented by (−result=−F+A+B).

3. Apparatus for implementing a power of two floating point estimation function as recited in claim 2 wherein said combinational logic hardware further includes a ones complement function for taking a ones complement of said ones complement result to produce said fraction part of said floating point result.

4. Apparatus for implementing a power of two floating point estimation function as recited in claim 2 wherein said adder includes a 11 bit adder for adding A and said ones complement of F and a 2 bit adder for adding B and said ones complement of F to provide said ones complement result represented by (−result=−F+A+B).

5. Apparatus for implementing a power of two floating point estimation function as recited in claim 4 wherein said combinational logic hardware further includes a multiplexer for selecting predefined bits of said ones complement result dependant only upon said ones complement of F or a sum of said ones complement of F and A based upon B being non-zero.

6. Apparatus for implementing a power of two floating point estimation function as recited in claim 1 wherein said floating point result includes eleven fraction bits represented by yF(1 to 11).

* * * * *